N. Maxson,
Wood Fence,

N° 82,733.      Patented Oct. 6, 1868.

Witnesses.
Frederic Thomas
E. R. Beadle

Inventor
Nathan Maxson
by
H. W. Beadle

United States Patent Office.

NATHAN MAXSON, OF WILMINGTON, OHIO.

Letters Patent No. 82,733, dated October 6, 1868.

---

IMPROVEMENT IN FENCE.

---

The Schedule referred to in these Letters Patent and making part of the same.

---

TO ALL WHOM IT MAY CONCERN:

Be it known that I, NATHAN MAXSON, of Wilmington, in the county of Clinton, and State of Ohio, have invented a new and improved Fence; and I do hereby declare that the following is a full and exact description of the same, reference being had to the accompanying drawings, and to the letters of reference marked thereon.

This invention consists in certain improvements in the manner of constructing earth-fences, as will be fully described hereinafter.

Figure 1:
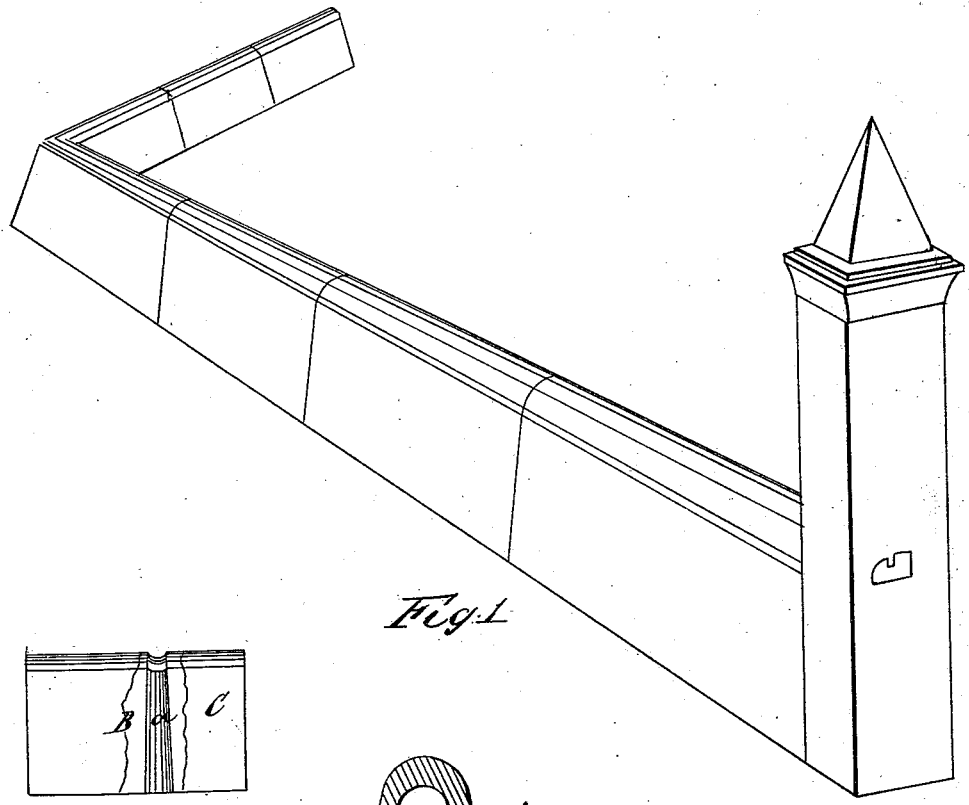

Figure 1 represents a perspective view, and

Figure 2:
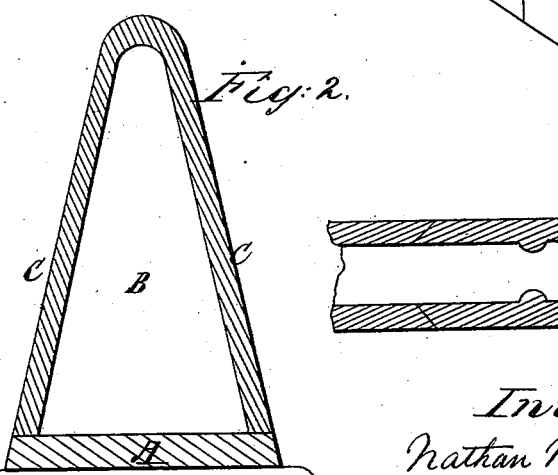

Figure 2 a sectional view of my fence.

In the drawings—

A represents the lower coating of cement or other suitable substance, which forms the ground-work of the fence.

B represents the fence proper, which consists of earth, or any suitable material, made in any proper form.

C C represent the outer coating, of cement or other substance, by which the earth is protected from the action of the weather.

The construction of the fence is as follows:

The line having been first laid down, the earth is thrown up from each side, to form a ridge, the top of which is levelled off, and made as wide as the base of the fence to be built. Upon this, a coat of cement or other suitable impervious substance is laid, of any thickness, for the purpose of protecting the fence from moisture arising from the ground. This having become thoroughly dry, the earth is built upon it in any desired form.

It is, however, deemed the best plan to construct it cone-like, having the sides inclined from the base to an apex at the top. This form gives the greatest solidity, and, at the same time, readily sheds the rain and other moisture.

The earth may be given this shape in any suitable way. It may be moistened, and built up by hand, or it can be formed in a mould by pounding. Other ways may readily suggest themselves of constructing it. This earth should also be allowed to settle and dry thoroughly, when the outer coating of cement should be applied. This should be laid on in sections, with the edges bevelling or lapping together.

This arrangement, it is believed, will allow the edges to expand over each other, and contract again, without cracking. Grooves should be made down the sides of the earth before the cement is laid on, the latter, however, being put on perfectly smooth, by which means the coating is strengthened, at regular intervals, as it were, by bars of cement.

This arrangement would prevent the coating from sliding down in case of its cracking longitudinally.

It may also be best to construct air-passages through it. One might be made through the length of the fence, at the base, with proper side openings, and connecting with these others, rising through to the top, at regular intervals.

The best arrangement, however, of these, and the size and form of these, would be determined by experiment. It is also not necessary that the interior should be entirely of earth. It may be mixed with stone or gravel, or any other convenient and suitable substance. It may be found desirable to cover the outer coating with water-proof paint, or coal-tar, or some similar substance.

By this arrangement, the interior earth is protected completely from the atmospheric changes by its impervious surroundings.

The ditches upon each side, made by removing the earth for the fence, draw the moisture from it, and it is not liable to damage by frost.

This fence can be quickly and cheaply constructed, and will be especially valuable where building-materials are scarce.

I disclaim all parts of this invention covered by the patent of Calvin A. Strong, May 13, 1862.

Having thus described my invention, what I claim as new, and desire to secure by Letters Patent, is—

The fence A B C, constructed as described, that is, having the foundation A, interior B, and covering C, the latter being laid on in sections, with bevelling edges, and being strengthened, at regular intervals, by bars, formed in the manner described, the whole being combined and arranged as and for the purposes set forth.

This specification signed and witnessed, this twenty-second day of February, 1868.

N. MAXSON.

Witnesses:
  H. W. BEADLE,
  E. R. BEADLE.